April 3, 1945.  H. C. OSBORN, JR  2,373,046

PRESSURE RELIEF VALVE

Filed Aug. 15, 1942

INVENTOR.

BY HENRY C. OSBORN JR.

Bates Teare & McKean
ATTORNEYS

Patented Apr. 3, 1945

2,373,046

UNITED STATES PATENT OFFICE 2,373,046

PRESSURE RELIEF VALVE

Henry C. Osborn, Jr., Cleveland Heights, Ohio, assignor to Glascote Products, Inc., Cleveland, Ohio, a corporation of Ohio Application August 15, 1942, Serial No. 454,934

3 Claims. (Cl. 137—53)

This invention relates to an improved pressure relief valve and particularly to a relief valve which will act to relieve both excess and deficient pressures, and to a pressure relief valve which will be particularly adapted for use on transportable liquid containers. These, therefore, are the general objects of the present invention.

A more specific object of this invention is to provide a pressure relief valve, particularly adapted for use on transportable liquid containers, such as for instance railways and automotive tanks, and which valve will relieve excess and deficient pressures within the tank to which it is applied without being responsive to the surge of the fluid contents of the tank during the transportation thereof.

Another object of this invention is to provide a pressure relief valve which may be maintained in a highly sanitary condition to permit its use on containers, such as are used to fluid transport foodstuffs, such as milk.

A further object of the present invention is to provide an improved pressure relief valve which will comprise a comparatively small number of parts, easily separable one from the other and individually cleaned. A more specific object of the present invention is to provide a simple and efficient relief valve or vent device which may be attached at the end of a transportable tank without danger of inadvertent actuation of the relief mechanism due to surging of the fluid contents of the tank.

Other objects and advantages of the present invention will become more apparent from the following description which relates to a preferred embodiment of the invention, illustrated in the accompanying drawing. The essential and novel features of the invention will be set forth in the claims.

Figure 1:
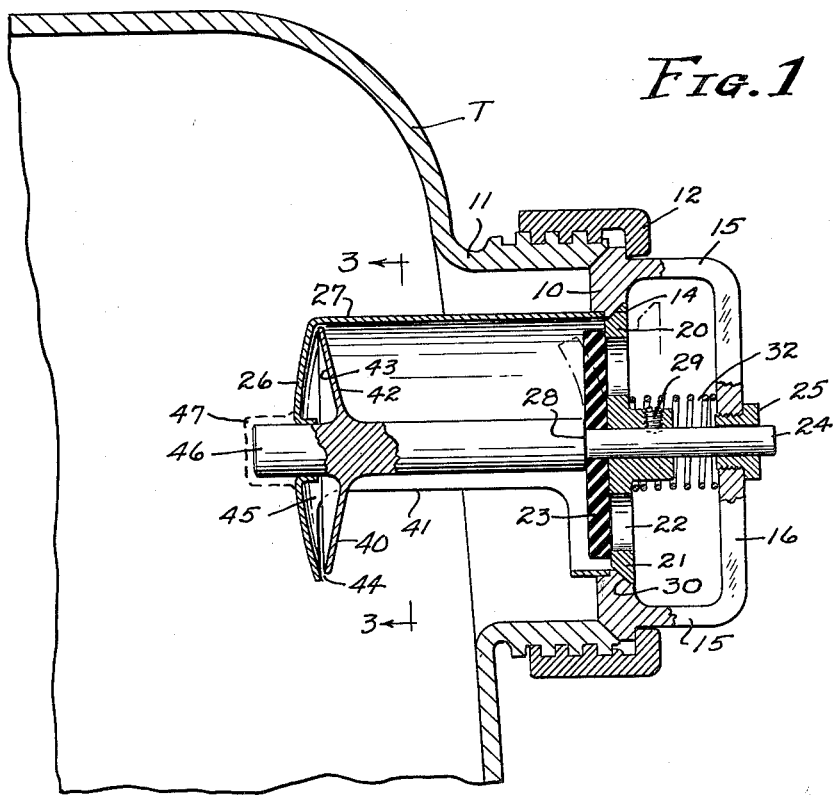
Figure 2:
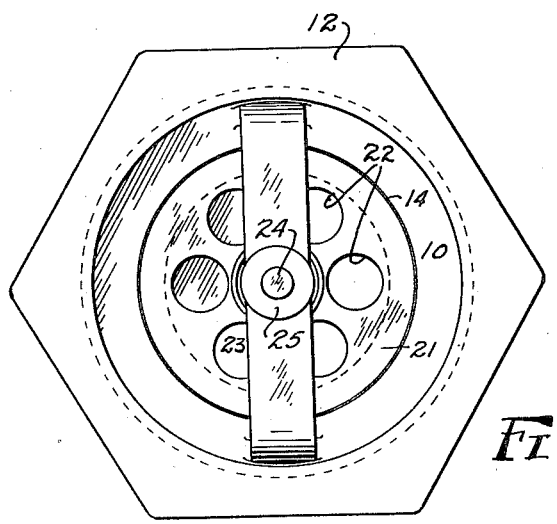
Figure 3:
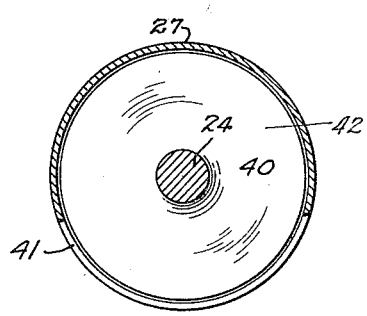

Referring now to the drawing. Fig. 1 is an axial section through my improved pressure relief mechanism, illustrating the same as applied to the end of a tank; Fig. 2 is an end elevation of the relief mechanism, and Fig. 3 is a transverse section as indicated by the line 3—3 on Fig. 1.

Referring now to the drawing, and especially to Figs. 1 and 2, it will be seen that my improved pressure relief valve comprises a ring 10 which may seat against the end of a vent tube or pipe 11 and be secured thereto by a union nut 12. In the drawings, the vent tube 11 is illustrated as an integral part of a tank or receptacle T. It is, however, to be understood that the vent tube may be made in any suitable manner and removably attached to the end wall of a tank. The ring 10 is provided with an enlarged central opening or valve port 14 and a pair of outwardly extending arms 15 which are connected at their tips by a bridge-like formation 16, spaced from the ring as shown in Fig. 1 and extending across the valve port opening 14. To facilitate cleaning of the assembly, the arms and bridge are preferably formed as a unitary structure with the ring.

The valve port opening 14 is normally closed by a compound valve member 20. This valve member comprises a valve disc 21 having a plurality of openings 22 formed therein. The openings 22 also are normally closed. As illustrated, a resilient flexible disc 23, made of rubber or some similar material, is positioned against the inner surface of the valve member 21, entirely closing the openings 22. The valve member 21 is carried by a valve stem 24. One end of this stem is slidably mounted in a bushing 25 carried by the bridge 16 of the ring 10, and at its other end, the stem is slidable in the end wall 26 of a cylindrical cap 27 which is secured to the inner surface of the ring 10 and extends inwardly into the vent tube, as shown in Fig. 1. The resilient member 23 is positioned against a shoulder 28 of the stem 24 and held thereagainst by the valve member 21 which is secured to the stem by a suitable screw 29.

As will be seen from Fig. 1, the valve seat and valve member 21 are provided with complementary beveled surfaces 30, so arranged that an axial movement of the stem towards the bridge 16 causes an opening of the valve port. A suitable spring 32, surrounding the stem and interposed between the bridge 16 and the valve member 21, normally retains the valve member on its seat. When, however, the pressure within the tank T rises above a predetermined maximum pressure, the action of this spring will be overcome and the valve member will move away from the seat to a position such as indicated by the dotted lines in Fig. 1, until the excess pressure is relieved, whereupon the spring will reseat the valve member. On the other hand, should the pressure within the tank drop below a predetermined minimum pressure, the reduction of pressure on the inner surface of the flexible disc 23 will cause the disc to flex inward under the impulse of atmospheric pressure acting on the opposite surface thereof in the region of the openings 22 of the valve member 21. The flexible member 23 will then remain separated from the valve member 21, as indicated by the dotted lines on Fig. 1, until the pressure in the tank returns to the predetermined minimum. The maximum pressure permitted in the tank is controlled by the degree of tension of the spring 32, whereas the minimum pressure is controlled by the degree of resiliency of the disc 23.

An important feature of my improved pressure relief valve mechanism is the arrangement which prevents the surge of the fluid within the tank from opening the valve due to the impact of the fluid contents against the inner surface of the compound valve member 21—23, thereby enabling the use of the valve on transportable tanks without danger of loss of the contents, due to surging conditions of the fluid.

I have found that the rise or fall of the pressure in the tank takes place gradually. This is in direct contrast to the action of the surge which makes a sudden and momentary impact of the fluid against the valve member. The difference in these actions enables the balancing of the pressure on the valve member due to the impact of the surging fluid without altering the operation of the valve member due to a rise or fall of the pressure within the tank.

The balancing of the pressure on the valve member, due to a surge of fluid within the tank, is accomplished by mounting a disc 40 on the valve stem, in close proximity to the inner surface of the end wall 26 of the cylindrical housing 27. This disc is as large or slightly larger in diameter than the diameter of the inner exposed surface of the compound valve member 21—23. The outer surface 43 of the disc is completely protected from the surging fluid by the end wall of the cylinder. Preferably the end wall of the cylinder is disked outwardly while the disc 40 is disked in the opposite direction. The impact of the surging fluid against the valve member is balanced by the impact of the surge against the surface 42 of the disk and accordingly the valve member remains closed under surge conditions.

The member 40 has no effect on the valve member during a rise or fall of pressure within the tank. The rate of the rise and fall of pressure in the tank being slow, the comparatively small crevice between the edges of the disc 40 and the end wall of the cylinder maintains the pressure equal on both sides of the disc except during surging impacts. While the surge may have some effect on the exposed end 46 of the stem 24, it is relatively small due to the great differences in diameters of the stem and disc. This may be avoided where a relatively delicately responsive valve is required by forming the end wall 26 of the cylinder to receive and protect the stem as indicated by the dotted lines 47 in Fig. 1.

From the foregoing description, it will be seen that my improved relief valve mechanism is simple, readily cleansed and entirely self-contained, and further that the loss of fluid due to surges is prevented entirely by means carried by the valve member and without the securing of baffles or other devices to the interior wall of the tank as has been customary in the past.

I claim:

1. In a pressure relief valve, a member having a valve port opening extending therethrough, a bridge carried by said member extending across the opening therein, a valve stem slidably mounted in said bridge, a valve carried by said stem arranged and adapted to close said valve port opening, resilient means interposed between said bridge and said valve to normally maintain said valve in a closed position, a cylinder carried by said member, said cylinder extending inwardly from said member and having an axially extending opening in its side wall, one end of said cylinder being closed by said valve and the other end thereof being closed by a closure, and a disc carried by said stem in close proximity to said closure and of a slightly smaller diameter than said closure and forming a chamber between such closure and disc communicating with the exterior of said cylinder through an adjacent portion of said axial opening, and said disc and axial opening being arranged and constructed so that the area of the communication passage increases as the valve opens.

2. In a pressure relief valve for a tank, a member having a valve port opening extending therethrough and arranged to be secured to said tank, a valve stem slidably mounted in said member and projecting axially through said valve port opening, a valve member carried by said valve stem, resilient means to normally retain said valve in a position to close said valve port, a disc mounted on said member and being spaced inwardly therefrom, a second disc of substantially the same diameter as said valve member and carried by said stem coaxial with and in close proximity to said first named disc, whereby a surge of fluid controlled by said valve will react against one surface only of said last-named disc, thereby equalizing the pressure against the valve due to the surge of the fluid controlled by the valve, the close proximity of said discs preventing the surging fluid from entering the space therebetween while permitting normal pressure conditions of the controlled fluid to react on both surfaces of the last-named disc.

3. In a pressure relief valve for a tank, a member having a valve port opening extending therethrough and arranged to be secured to said tank, an arm projecting outwardly and inwardly to a point above said valve port opening, a valve stem slidably mounted in said arm and projecting axially through said valve port opening, a valve member carried by said valve stem, resilient means interposed between said valve member and said arm to normally retain said valve in a position to close said valve port, a cylinder having one end mounted on said member around the valve member and having an inner closed end spaced inwardly from said valve and having an opening in its side wall, a disc of substantially the same diameter as said valve member carried by said stem coaxial with and in close proximity to the closed end of said cylinder, whereby a surge of fluid entering said cylinder opening will react against one surface only of said last-named disc, thereby equalizing the pressure of such surge against the valve member, a portion of the cylinder opening adjacent the closed end of the cylinder forming a communication between the exterior of the cylinder and the space between the closed end of said cylinder and said disc to permit normal pressure conditions entering said cylinder opening to react on both surfaces of the last-named disc.

HENRY C. OSBORN, Jr.